United States Patent [19]

Carnevale et al.

[11] Patent Number: 4,750,575

[45] Date of Patent: Jun. 14, 1988

[54] CHEST HIGH BEAM SCALE

[75] Inventors: Francesco L. Carnevale, Waynesboro; Glen D. Kemnitz, Pachuta, both of Miss.

[73] Assignee: Sunbeam Corporation, Downers Grove, Ill.

[21] Appl. No.: 26,795

[22] Filed: Mar. 17, 1987

[51] Int. Cl.⁴ .................... G01G 23/18; G01G 21/28; G01G 1/18
[52] U.S. Cl. .................................... 177/47; 177/241; 177/246
[58] Field of Search .......................... 177/47, 241, 246

[56] References Cited

U.S. PATENT DOCUMENTS

1,943,651  1/1934  Bousfield ............................ 177/241
3,031,021  4/1962  Hale et al. ....................... 177/47 X
3,743,040  7/1973  Hutchinson et al. ........... 177/241 X Primary Examiner—George H. Miller, Jr.
Attorney, Agent, or Firm—Neil M. Rose

[57] ABSTRACT

A chest high balance beam scale including balance indication means on the head of the scale which is observable from above to allow the user to determine when the beam of the scale is in balance. The head portion of the scale is fabricated of molded plastic with the balance beam being a rectangular frame which forms part of an enclosure for the balance weights and balance indicator.

14 Claims, 4 Drawing Sheets

CHEST HIGH BEAM SCALE

FIELD OF THE INVENTION

The invention relates generally to weighing scales for use in weighing human beings, and, more specifically, relates to a beam scale designed for home or professional use in doctors' offices or hospitals. As is typical of a beam scale, there are two movable weights which are adjusted to balance the load on a platform, and the position of the weights provides an indication of the load applied to the platform. Means are provided to ascertain when the weights have been properly adjusted and the beam is in balance.

BACKGROUND OF THE INVENTION

Beam scales have typically been used primarily in professional applications such as doctors' offices and in hospitals for weighing people with more precision than is normally required by an individual weighing himself in the home. Accordingly, the scales normally sold and purchased for domestic use have been termed "bath scales" and typically include rather crude means for measuring the amount of displacement of a platform against a spring force to provide an indication of weight within a pound or two. More recently, the public has been interested in monitoring weight more precisely than is possible with the usual bath scale. Accordingly, there has developed a substantial domestic market for beam scales of the type usually sold for professional use.

The typical professional beam scale has been made using entirely metal parts which are fabricated with dimensional precision, resulting in very high manufacturing costs. In addition, the typical beam scale used by doctors would extend to a substantial height above the floor so that it could be easily inspected by the user to ascertain whether the beam in the scale had been brought to its level position by adjusting the various weights. This eye level height construction of the beam scale made it bulky and cumbersome to transport from one place to another. Accordingly, it would be desirable to provide a beam scale having the accuracy of the presently known professional beam scales while at the same time being lower in cost and less bulky in configuration.

BRIEF DESCRIPTION OF THE INVENTION

The present invention relates to a chest high beam scale which is fabricated primarily of molded plastic parts in order to reduce the cost of the scale. The scale extends only to chest height rather than eye level height and means are provided to permit the user of the scale to look downwardly at the top of the scale and still ascertain when the beam has been brought to its level or balance position. By use of a low friction motion conversion means the scale makes it possible to see in a horizontal plane an indication of the vertical out-of-level condition of the beam with respect to its support arm. This motion conversion means takes the form of an indicator wheel mounted for rotation about a horizontal axis on the balance beam and positioned to be engaged by a horizontally extending pin so that balancing of the beam may be accomplished by aligning two indicia which move horizontally with respect to one another and are easily visible from above.

The balance beam consists of a molded plastic, rectangular frame member having end walls in which weight supporting rods are mounted and having an end compartment in which the indicator wheel is journaled. The support arm of the scale which pivotally supports the plastic balance beam is also a molded plastic member. The base of the scale is of molded plastic or die cast metal, having an upwardly facing pocket which receives a metal pan within which the force collecting levers and the load receiving platform are mounted providing a scale having low material costs and being easy to assemble.

Accordingly, it is an object of the present invention to provide an improved, low cost, chest high, beam scale;

It is another object of the present invention to provide a chest high beam scale having motion conversion means to permit a user to ascertain when the beam is balanced by simply looking downwardly at indicia means associated with the movable beam and the fixed support arm;

It is another object of the present invention to provide a low cost beam scale having a molded plastic balance beam and support arm;

Further objects and advantages of the instant invention will become obvious to one skilled in the art as the following description proceeds, and the features of novelty which characterize the invention will be pointed out in the claims annexed to and forming a part of the specification.

BRIEF DESCRIPTION OF THE DRAWINGS

The present invention will be understood and appreciated more fully from the following detailed description taken in conjunction with the drawings in which.

DETAILED DESCRIPTION OF THE INVENTION

Figure 1:
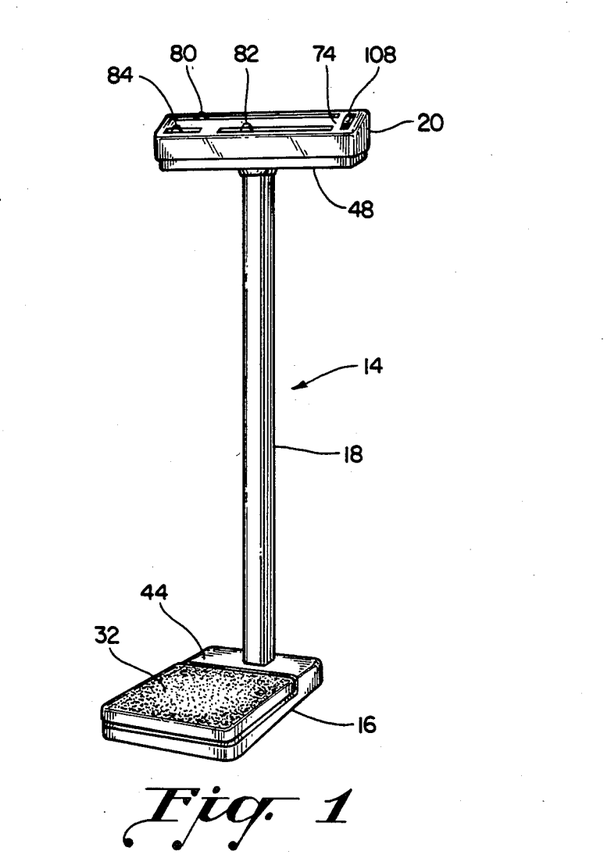
FIG. 1 is a front perspective view of a beam scale embodying our invention.

Referring to FIG. 1 of the drawings, there is shown a beam scale designated generally by reference numeral 14. The scale 14 includes a base 16, a column 18 and a head assembly 20 which are assembled and retained together in a manner to be described below.

Figure 5:
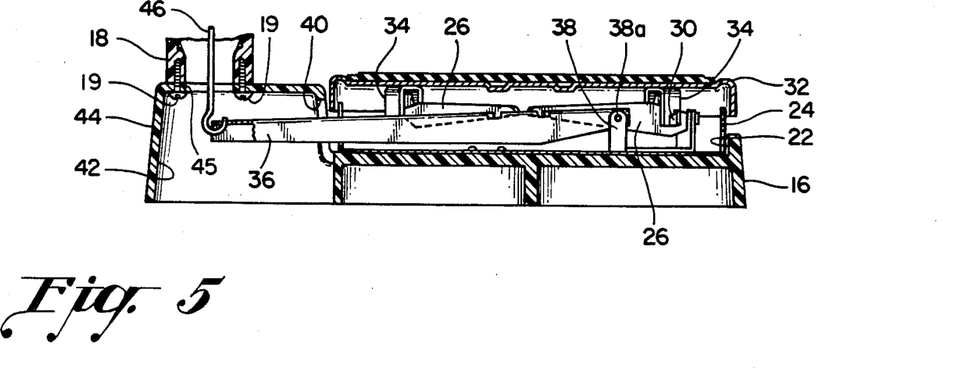
FIG. 5 is a vertical sectional view of the base and platform of the scale shown in FIG. 1.
Figures 6, 11:
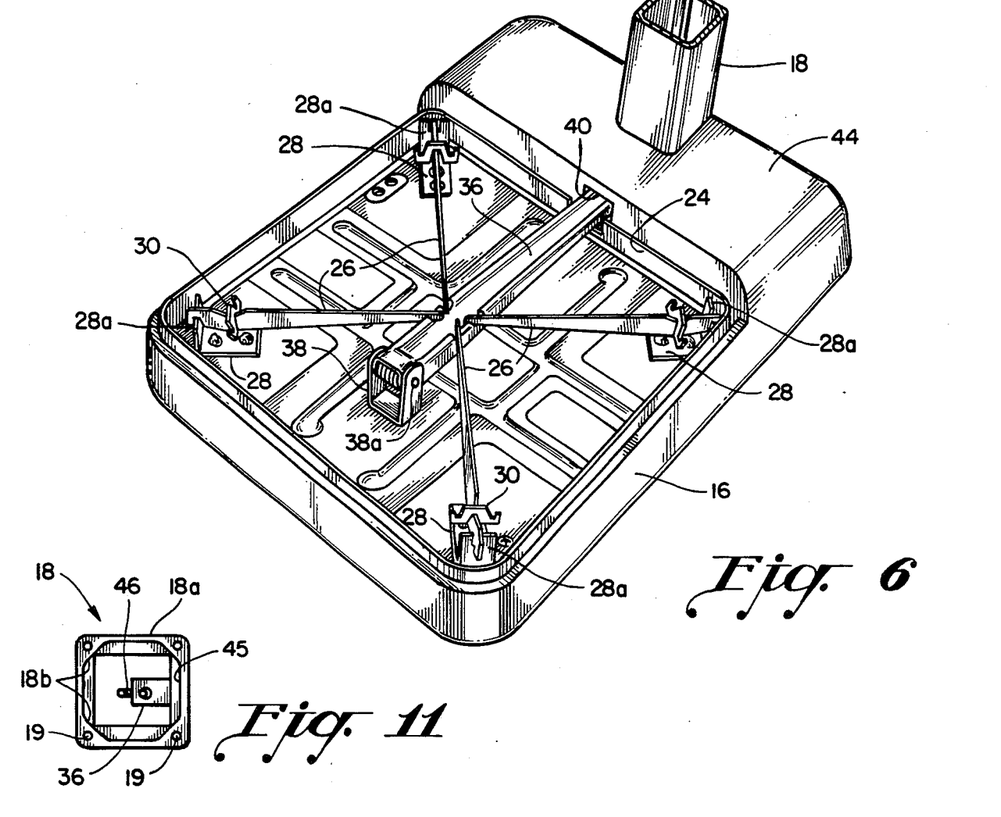
FIG. 6 is a perspective view of the base with the platform removed to show the force gathering levers and the force lever which transmits force from the platform to the beam in the head assembly.
FIG. 11 is a sectional view of the head supporting column showing the corner pockets for receiving the base assembly screws.

The base 16 may be a die cast metal part or may be formed of molded plastic and includes a shallow upwardly facing pocket 22 within which is received a correspondingly shaped metal pan 24. Screws extending through the adjacent bottom portions of the pan 24 and the base 16 secure the pan 24 in assembled relation to the base 16. The pan 24 serves to mount four force collecting levers 26 which have their outermost ends pivoted in the corners of the pan 24 by L-shaped brackets 28, having upwardly extending portions 28a which serve as knife edge pivots. Spaced inwardly of the ends of the force gathering levers 26 are W-shaped members 30 which are adapted to support a platform 32 with engagement by inverted U-shaped brackets 34 welded to the underside of the platform 32. The arrangement of the platform 32, the U-shaped brackets 34, the W-shaped members 30 and the levers 26 are conventional and form no part of the instant invention other than providing a means for delivering the load applied to the platform 32 to a force lever 36. The force lever 36 is pivoted at one end to a bracket 38 by pin 38a and has the other end extending through an opening 40 formed in the side of the pocket 22. The force lever 36 extends into a second pocket 42 which faces downwardly and is positioned in a portion 44 of the base 16 extending laterally from the portion defining the pocket 22.

As may best be seen in FIG. 5, the force lever 36 extends into the pocket 42 so that the end of the force lever 36 remote from its pivot mounting pin 38a is positioned beneath and in alignment with the passageway in the column 18 which extends upwardly from the base 16. The portion 44 of the base 16 is formed with an opening 45 which communicates between the pocket 42 and the interior of the column 18. A vertically extending link 46 is positioned within the hollow column 18 extending through the opening 45 and interconnects the force lever 36 with the head assembly 20 in a manner to be described in greater detail below.

A cross-sectional view of column 18 is shown in FIG. 11 to illustrate the manner in which column 18 is secured to the base 16. The column is box-shaped with side walls 18a which join each other at right angles. At the corners within the column 18 there are angled walls 18b which provide longitudinally extending pockets into which screws 19 extend upwardly through the top wall of base 16. The screws 19 are self-tapping and engage the triangular passageways formed by walls 18a and 18b to secure firmly the column 18 to the base 16.

Figure 3:
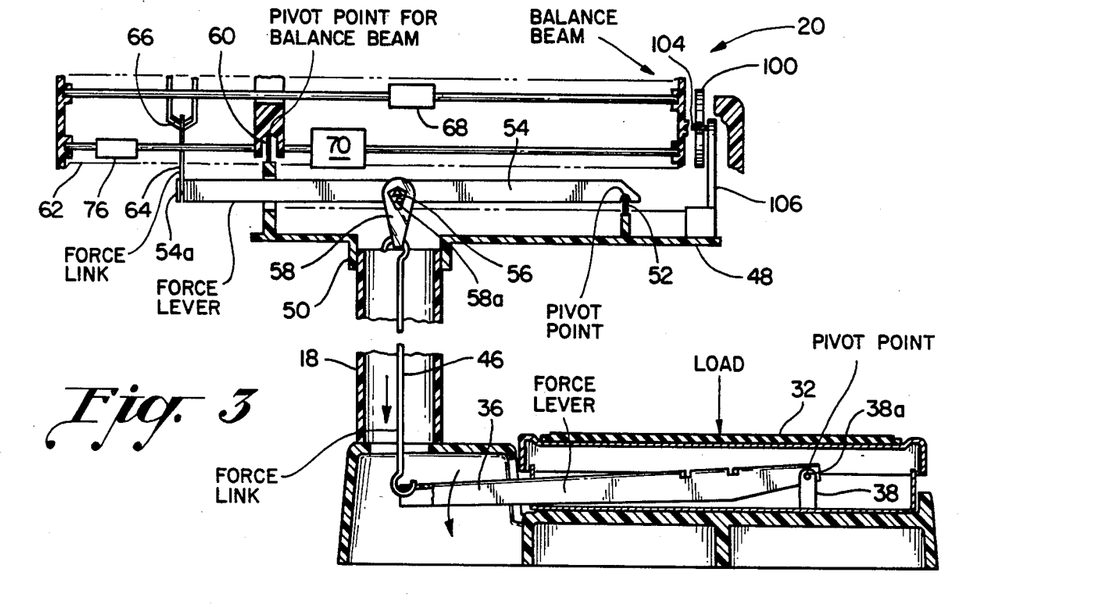
FIG. 3 is a schematic sectional view showing the lever system associated with the load receiving platform and the balance beam, the sectional portion of the base being rotated 90 degrees with respect to the actual position of the sectioned portion of the head assembly for illustration purposes.
Figure 4:
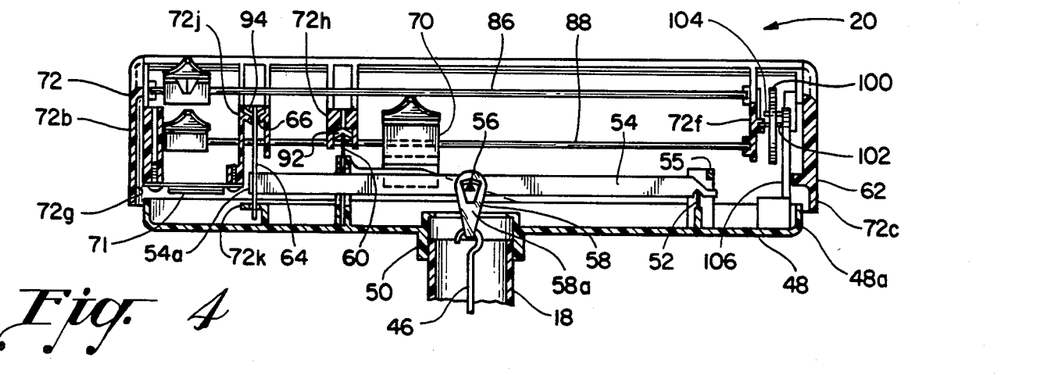
FIG. 4 is a vertical sectional view of the head assembly of the scale shown in FIG. 1.
Figure 9:
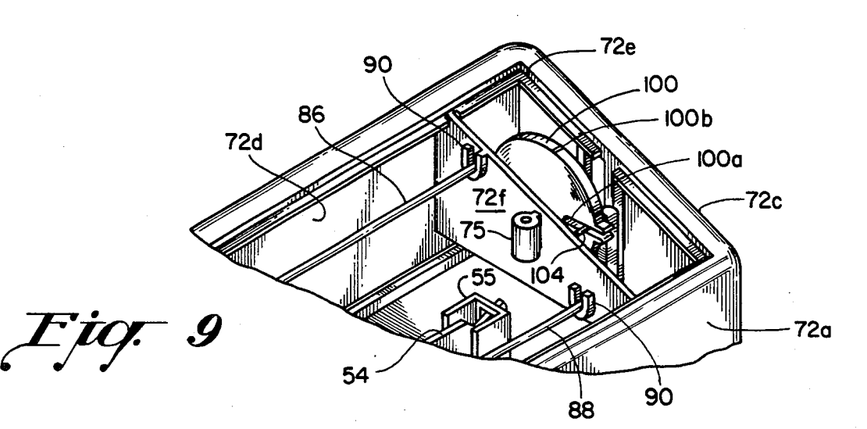
FIG. 9 is an enlarged fragmentary perspective view of the level indicating means on the balance beam.

Prior to describing the details of the head assembly 20, a brief description will be given of the force levers, the balance beam and how these elements are interconnected, making reference to FIG. 3 which is a simplified, schematic showing of the system. The head assembly 20 includes a laterally extending support arm 48 which is mounted on the top of the column 18 by means of a downwardly extending sleeve 50 in which the top of the column 18 is received and retained by screws (not shown). The support arm 48 has, adjacent to the right end thereof, as shown in FIG. 3, a knife edge pivot 52 on which a force lever 54 is supported. The force lever 54 is restrained to a limited extent from moving upwardly away from the pivot 52 by a retainer wall 55 which is molded integrally with arm 62 and overlies the end of the force lever 54 as best shown in FIGS. 4 and 9. Intermediate its ends, the force lever 54 has a pair of knife edge bearings or supports 56 extending from opposite sides thereof, one being shown in FIG. 3. A U-shaped yoke 58 has legs extending on both sides of the lever 54 and is formed with openings 58a in which the knife edge bearings 56 are received. The yoke 58 serves to interconnect the force lever 54 with the link 46 to transmit a downward force from the force lever 36 in the base 16 to the force lever 54 in the head assembly 20.

At the left end of the support arm 48 as shown in FIG. 3, there is provided a pair of laterally spaced knife edge bearings 60 (one of which is shown in FIGS. 3 and 4) which pivotally support a balance beam 62. In order to interconnect the balance beam 62 with the force lever 54, there is provided a link 64 which at its lower end engages a hook-like projection 54a on the left end of the force lever 54 and at its upper end engages a V bearing 66 which is supported on the balance beam 62. In order to counterbalance the forces transmitted to the balance beam 62 to the left of the bearing 60, as shown in FIG. 3, there are provided small and large balance weights 68 and 70, respectively, which are disposed to the right of the pivot point 60.

From the foregoing, it should be clear that the force from a load applied to the platform 32 is transmitted to the force lever 36 through the four force gathering levers 26. The force gathering levers engage the force lever 36 to the left of the pivot mounting pin 38a at the right end as shown in FIG. 3, causing the force lever 36 to pivot counterclockwise, placing a downward force on the link 46. This force in turn is transmitted to the force lever 54 which is pivoted at 52, thereby causing the force lever 54 to pivot counterclockwise about the pivot 52 and to exert a downward force through the link 64 on the balance beam 62, causing it to pivot counterclockwise around the pivot at the bearings 60. The load applied force tending to pivot the balance beam 62 counterclockwise is balanced by the large and small weights 70 and 68 which may be adjustably positioned as will be described below to balance the beam 62. The positions of the weights 68 and 70 required to balance the beam 62 provides an accurate indication of the magnitude of the load applied to the platform 32 or in normal use, the weight of the individual standing on the platform.

Since the balance beam 62 is pivoted at 60 which is located at a point displaced considerably to the left (as viewed in FIG. 4) from the center point of the beam, it is desirable to provide a fixed counterbalance weight 71 which is designed to balance the beam 62 about the pivot 60. The weight 71 may take the form of a series of plates secured to downwardly projecting bosses molded in the beam 62.

Figure 2:
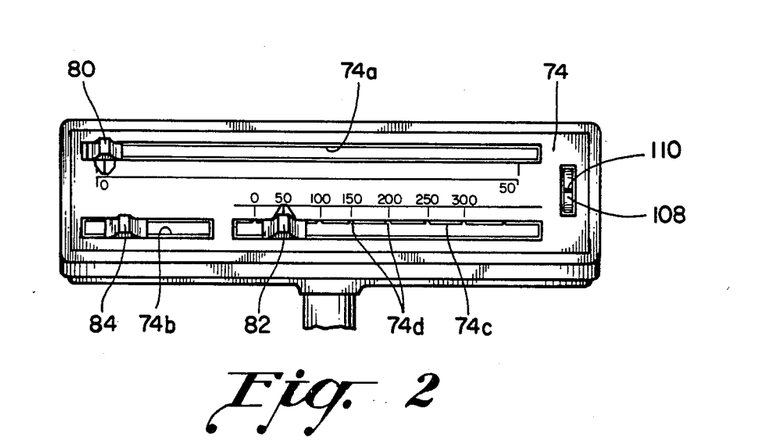
FIG. 2 is a top view of the head assembly of the scale showing the various manual controls used in leveling the balancing beam of the scale.
Figure 8:
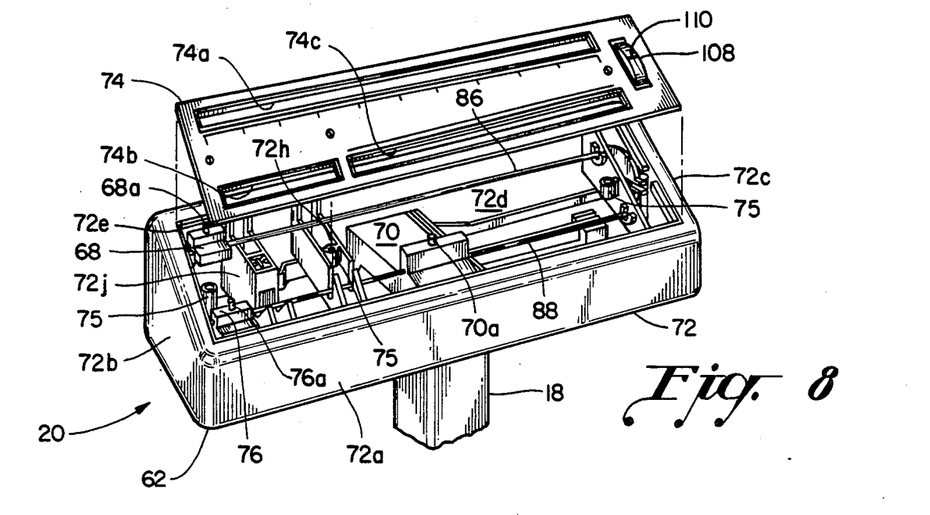
FIG. 8 is an exploded perspective view of the head assembly showing the indicia plate spaced upwardly from its normal position mounted on the beam.

To better understand the constuction of the head assembly 20, reference should be made to FIG. 8 in which the head assembly is shown in perspective. The balance beam 62 is made up primarily of a molded plastic frame member 72 having a front wall 72a, end walls 72b and 72c and a rear wall 72d. These walls 72a, 72b, 72c and 72d form a rectangular frame having an upwardly facing top opening 72e which is closed by an indicia plate 74 shown in a disassembled or exploded position in FIG. 8, whereas, in FIGS. 1 and 2 it is shown positioned in the opening 72e. Screws (not shown) extend through openings in the indicia plate 74 into threaded engagement with openings in the bosses 75 molded integrally with the frame 72 to retain the plate 74 assembled to the frame 72. The plate 74 is formed with three slots 74a, 74b and 74c. The above described balance weights 68 and 70, as well as a zeroing weight 76 include portions 68a, 70a and 76a which extend through the slots 74a, 74c and 74b, respectively, for connection with manual adjustment means or indicators 80, 82 and 84 as are best shown in FIG. 2. Thus, in balancing the balance beam 62, the user would initially zero the scale 14 using the adjustment means or knob 84 to balance the beam while there is no load on the platform of the scale. Then, after stepping onto the platform 32, the large weight 70 is adjusted to the nearest weight increment position available which is less than the actual weight of the person being measured. Thus, if the person being weighed was between 160 pounds and 170 pounds, the indicator 82 would be set on 150 pounds. The selectable increments for the indicator 82 are 50 pounds apart, there being settings for 0, 50, 100, 150, 200, 250 and 300 pounds.

As may best be seen in FIG. 2, there are notches 74d associated with one side of the slot 74c. Associated with each one of these notches is a weight indication, there being 50 pound increments between each of the notches. The notches 74d cooperate with the projection 70a on the weight 70 to form a detent mechanism which locates the weight 70 in one of the selected positions.

After the large weight 70 has been positioned, the small weight 68 is adjusted by means of the indicator 80 until the beam 62 is balanced, at which time the weight may be determined by adding the readings of the indicators 80 and 82. This manner of adjusting multiple weights to measure weight with a beam scale is old and well known in the art.

Figure 10:
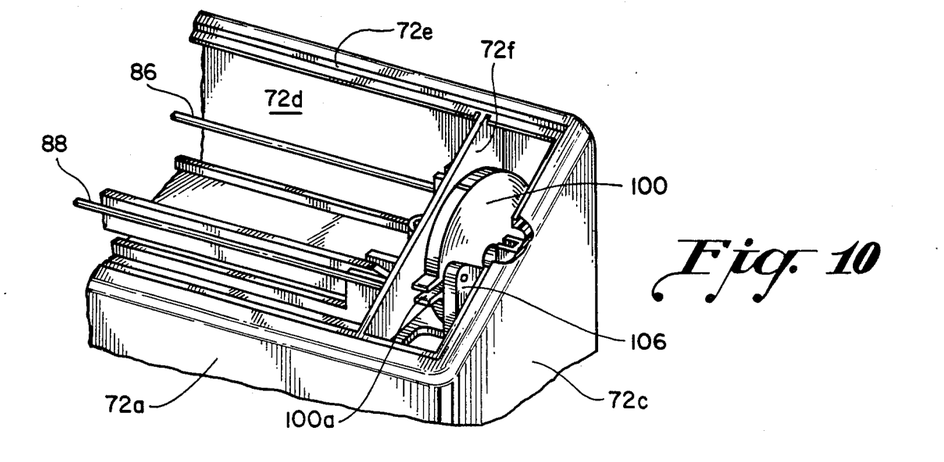
FIG. 10 is a fragmentary perspective view of the end of the balance beam similar to FIG. 9 but showing the side of the level indicating means opposite from that shown in FIG. 9.

Within the frame member 72 of the balance beam 62, there is a partition wall 72f which is spaced from and parallel to the end wall 72c and is best shown in FIGS. 9 and 10. The partition wall 72f has as one of its functions the support of a pair of weight support rods 86 and 88. The rods 86 and 88 are mounted at one end in the partition wall 72f and at the other end in the end wall 72b of the frame member 72 by means of channels 90 which face upwardly and cradle the ends of the rods 86 and 88. To retain the rods within the channels 90, there are projections formed on the underside of the indicator plate 74 which engage the rods 86 and 88 and prevent upward movement from the channels 90. The weights 68, 70 and 76 are made of die cast metal and are provided with passageways in which the rods 86 or 88 are received. The large weight 70 is different from the other weights 68 and 76 in that it is eccentrically mounted with respect to its support rod 88 so that it tends to rotate about the rod 88. The purpose of the eccentric mounting with most of the weight being positioned rearwardly of the rod 88 is to cause the projection 70a to be urged against the rear of the slot 74c tending to seat the projection 70a in one of the notches 74d to create the detent type action described above. Thus, as the indicator 82 is slid along the slot 74c, it will tend to stop as it reaches each notch 74d and can be moved along only by applying a slight forward pressure to the indicator 82 to rock the weight 70 about the support rod 88 and thereby disengage the projection 70a from the notch 74d.

The frame member 72 is formed to have a downwardly facing opening 72g within which the support arm 48 is received, as is best shown in FIG. 4. The support arm 48 in FIG. 3 is shown schematically as are the other parts and is not shown to extend completely across the opening 72g. As shown in FIG. 4, the support arm 48 extends across opening 72g to form effectively a closure for that opening. Since the balance beam 62 is mounted for limited pivotal movement with respect to the support arm 48, there is a slight clearance between an upwardly extending flange 48a on the support arm and the walls defining the opening 72g. The frame member 72 cooperates with the support arm 48 and the overlying indicia plate 74 to form a housing for the force lever 54, the weights 68, 70 and 76, and the innerconnecting linkages and weight support rods 86 and 88.

In order to provide the plastic parts which comprise the support arm 48 and the balance beam 62 with suitable bearing portions for the pivotal connection of the various levers, there are metal inserts provided which are mounted in slotted portions, or pockets, in the plastic member. In this connection, the knife edge bearing 52 for supporting the right end of the force lever 54 as shown in FIG. 3 is a metal plate received in cooperating slots in the support arm 48. Similarly, there are metal plates forming the spaced knife edge pivots 60 which insert into slots in the support arm 48 and which cooperate with V-shaped metal inserts which are received in slots in the balance beam 62. As shown in FIG. 8, there is a transversely extending double wall 72h which is shown in section in FIG. 4 as supporting a V-shaped metal bearing member 92 which cooperates with one of the knife edge bearing 60. These metallic inserts provide the wear characteristics necessary for precision bearings which would not be obtainable with the plastic parts 48 and 72 themselves.

Similarly, with respect to the link 64, the frame member 72 is formed with another transversely extending double wall 72j which supports a V-shaped metal insert 94 which forms the V-bearing 66 engaged by the link 64. In connection with the link 64, it should be noted that it projects downwardly below the force lever 54 and has an opening formed in the lower end through which an extension 72k (shown in FIG. 4) molded integrally with the support arm 48 extends. The purpose of the interengagement between the opening in the lower end of the link 64 and the projection 72k is to restrict the pivotal movement of the balance beam 62 with respect to the support arm 48. The opening in the bottom of the link 64 for the projection 72k is sufficiently large to permit enough pivotal movement of the balance beam 62 about the pivot 60 to determine when the system is in balance or out of balance.

Figure 7:
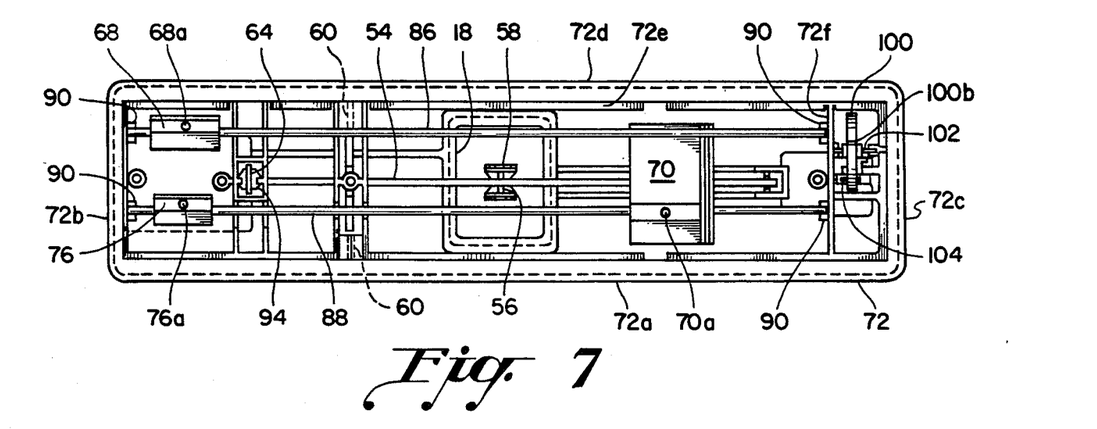
FIG. 7 is a top plan view of the head assembly with the indicia plate removed.

Turning now to the means for determining whether the beam 62 is in balance or out of balance, attention is directed to FIGS. 8, 9 and 10 which disclose the indicator wheel 100 which is a flat disk like member positioned with its plane extending vertically and provided with a horizontally disposed axle 102 as shown in FIG. 4. The axle 102 is journaled in open upwardly facing channels formed on the walls 72c and 72f, as is best shown in FIGS. 7 and 10. Projections extending downwardly from the indicator plate 74 overlie the ends of the axle 102 and cooperate with the open channels to journal the axle 102 for rotatable movement. The indicator wheel 100 is formed with a radially extending slot 100a within which is received a pin 104 which projects horizontally from a post 106 carried by the right end of the support arm 48 as shown in FIG. 4. As a consequence of the engagement of the pin 104 within the slot 100a, any relative movement between the support arm 48 and the balance beam 62 results in a rotation of the indicator wheel 100. In the level or balanced position of the indicator wheel and the associated balance beam 62, the slot 100a in the wheel 100 is positioned in a generally horizontal plane.

Formed at the top on the periphery of the indicator wheel 100 is a line 100b which is used to show when the balance beam is in balance. As best shown in FIGS. 2 and 8, there is provided at the right end of the indicia plate 74 a slot covered by a transparent housing 108. The indicator wheel 100 extends outwardly through the opening 72e in the frame 72 and through the slot formed in the indicia plate 74 into the transparent housing 108, the housing being shaped to conform closely to the contour of the sector of the wheel 100 extending through the plate 74. An indicia line 110 formed on the transparent housing 108 provides a fixed reference to which the line 100b on the wheel 100 may be aligned. This enables the user of the scale to look downwardly at the head assembly 20 and by viewing the relative positions of the lines 110 on the transparent housing 108 and the line 100b on the indicator wheel 100 is able to determine whether the beam 62 is in balance or out of balance. Assuming the beam is not in balance because the lines 110 and 100b are out of alignment, the user may then adjust the indicator 80 to reposition the small weight 68 and bring the beam 62 into balance.

The wheel 100 is very lightweight, being made of plastic, and the plastic support bearings in the walls 72f and 72c provide a substantially frictionless support for the wheel 100. The wheel 100 is molded with a second radial slot of the same size and diametrically aligned with the slot 100a so that the wheel 100 is balanced about its axis and will not tend to unbalance the beam 62. In addition, the sliding engagement between the pin 104 and the slot 100a provides a very low friction connection which has little or no tendency to disturb the balance of the beam 62. Accordingly, there is provided a motion conversion means whereby the vertical displacement of the beam 62 from its level or balance position is indicated in a horizontal plane by the line 100b on the wheel 100 so that the user of the scale 14 may look down and readily determine whether the balance beam is in balance or out of balance.

The motion conversion means including the wheel 100 permits the scale 14 to be made of lesser height than most professional beam scales, and the use of the molded plastic parts for the base, the support arm and the balance beam provide a low cost construction. The combination of the more compact design and the lower cost results in a beam scale which is more suitable for the domestic market than any beam scales heretofore available on the market or known in the art.

We claim:

1. A beam scale comprising a base and platform, a hollow column having a bottom end supported by said base, a head assembly being supported at an upper end of said column, said head assembly including a balance beam and a support arm, said support arm being secured to said upper end of said column and extending transversely with respect to said column and having means to pivotally support said balance beam, a first force lever mounted on said support arm and pivotally connected to said balance beam, a second force lever in said base supporting said platform and having one end extending into vertical alignment with said column, a link interconnecting said force levers to transmit force produced by a load on said platform to pivot said balance beam, movable weights carried by said balance beam to balance the force produced by said load on said platform, means to sense a balance condition in said balance beam, said last mentioned means including an indicator wheel mounted on said beam for rotation about a substantially horizontal axis, indicia means on said wheel and said beam to sense a balance condition of said beam by indicating when it is level, said indicia means being disposed in a substantially horizontal plane so that said indicia means may be viewed from above, said indicia means on said wheel being positioned at the uppermost edge of said wheel when said beam is in said balanced condition.

2. The beam scale of claim 1 wherein said means to sense a balance condition includes means mounted on said support arm which engage said wheel at a point spaced from its axis of rotation to rotate said wheel in opposite directions as it moves in either direction from said level position.

3. A beam scale comprising a base and platform, a hollow column having a bottom end supported by said base, a head assembly being supported at an upper end of said column, said head assembly including a balance beam and a support arm, said support arm being secured to said upper end of said column and extending transversely with respect to said column and having means to pivotally support said balance beam, a first force lever mounted on said support arm and pivotally connected to said balance beam, a second force lever in said base supporting said platform and having one end extending into vertical alignment with said column, a link interconnecting said force levers to transmit force produced by a load on said platform to pivot said balance beam, movable weights carried by said balance beam to balance the force produced by said load on said platform, means to sense a balance condition in said balance beam, said last mentioned means including an indicator wheel mounted on said beam for rotation about a substantially horizontal axis, indicia means on said wheel and said beam to sense a balance condition of said beam by indicating when it is level, said means to sense a balance condition including means mounted on said support arm which engage said wheel at a point spaced from its axis of rotation to rotate said wheel in opposite directions as it moves in either direction from said level position, said means mounted on said support arm including a horizontally extending pin which engages a radial slot in said wheel to provide a low friction connection between said pin and said wheel.

4. The beam scale of claim 3 wherein said beam and said wheel are mounted at chest height with respect to a person standing on said platform, said indicia being positioned on said wheel and beam for alignment in the level position of said beam.

5. A beam scale comprising a base and platform, a hollow column having a bottom end supported by said base, a head assembly being supported at an upper end of said column, said head assembly including a balance beam and a support arm, said support arm being secured to said upper end of said column and extending transversely with respect to said column and having means to pivotally support said balance beam, said base being of molded plastic and having an upwardly facing shallow pocket which is generally rectangular in plan view, a metal pan received in said pocket, said pan conforming closely to the shape of said pocket, a force lever mounted on said support arm and pivotally connected to said balance beam, a second force lever in said base supporting said platform and having one end extending into vertical alignment with said column, means attached to said pan for pivotally connecting said second force lever to said pan, support means in the corners of said pan to pivotally support a plurality of force gathering levers which extend from the corners of said pan toward the center of said pan for engagement with said second force lever, said force gathering levers supporting said platform which is rectangular in shape and overlies and encloses said pan, a link interconnecting said force levers to transmit force produced by a load on said platform to pivot said balance beam, moveable weights carried by said balance beam to balance the force produced by said load on said platform, means to sense a balance condition in said balance beam, said base including a laterally projecting column support portion which has a downwardly facing pocket into which said second force lever and said link extend, said support column being of molded plastic and having said bottom end secured to said support portion.

6. A beam scale comprising a base and platform, a hollow column having a bottom end supported by said base, a head assembly being supported at an upper end of said column, said head assembly including a balance beam and a support arm, said support arm being secured to said upper end of said column and extending transversely with respect to said column and having means to pivotally support said balance beam, movable weights carried by a balance beam to balance the force produced by said load on said platform, means to sense a balance condition in said balance beam, said last mentioned means including an indicator wheel mounted on said beam for rotation about a substantially horizontal axis, indicia means on said wheel and said beam to sense a balance condition of said beam by indicating when it is level, said means to sense a balance condition including actuator means mounted on said support arm to engage said wheel at a point spaced from its axis of rotation to rotate said wheel in opposite directions as said balance beam moves in either direction from said level position, said beam and said wheel being mounted at chest height with respect to a person standing on said platform, said indicia being positioned at the top edge of said wheel and on a portion of said beam horizontally spaced from the indicia on said wheel for alignment in the level position of said beam, said indicia on said wheel and said beam being disposed for observation from above.

7. A beam scale comprising a base and platform, a hollow column having a bottom end supported by said base, a head assembly being supported at an upper end of said column, said head assembly including a balance beam and a support arm, said support arm being secured to said upper end of said column and extending transversely with respect to said column and having means to pivotally support said balance beam, movable weights carried by a balance beam to balance the force produced by said load on said platform, means to sense a balance condition in said balance beam, said last mentioned means including an indicator wheel mounted on said beam for rotation about a substantially horizontal axis, indicia means on said wheel and said beam to sense a balance condition of said beam by indicating when it is level, said means to sense a balance condition including actuator means mounted on said support arm to engage said wheel at a point spaced from its axis of rotation to rotate said wheel in opposite directions as said balance beam moves in either direction from said level position, said actuator means mounted on said support arm including a horizontally extending pin which engages a radial slot in said wheel to provide a low friction connection between said pin and said wheel.

8. The beam scale of claim 7 wherein said beam and said wheel are mounted at chest height with respect to a person standing on said platform, said indicia being positioned on said wheel and beam for alignment in the level position of said beam.

9. The beam scale of claim 7 wherein said balance beam comprises a rectangular frame having vertical end and side walls defining a mechanism chamber, a partition wall extending across said chamber adjacent one end wall, said partition wall being parallel to and spaced from said one end wall to accommodate said wheel and said actuator means, said wheel having an axle which is journaled for rotation in said one end wall and said partition wall.

10. The beam scale of claim 9 including a pair of parallel rods extending across said mechanism chamber and slidably supporting said movable weights, said frame having a second end wall at the end remote from said one end wall, the ends of said rods being mounted in said partition wall and said second end wall.

11. A beam scale comprising a base and platform, a hollow column having a bottom end supported by said base, a head assembly being supported at an upper end of said column, said head assembly including a balance beam and a support arm, said support arm being secured to said upper end of said column and extending transversely with respect to said column and having means to pivotally support said balance beam for oscillation about a horizontal axis, said balance beam having a free end remote from said horizontal axis which is displaced upwardly or downwardly when said balance beam is out of balance, movable weights carried by a balance beam to balance the force produced by said load on said platform, means to sense a balance condition in said balance beam, said means including a motion conversion means mounted on said balance beam to convert the upward or downward displacement of said free end into a horizontal displacement, indicia means on said motion conversion means and said beam to sense a balance condition of said beam by indicating when said balance beam is level, said means to sense a balance condition including actuator means mounted on said support arm to engage said motion conversion means to displace an indicator horizontally in opposite directions when said free end moves in either direction from its balanced position.

12. A beam scale comprising a base and platform, a hollow column having a bottom end supported by said base, a head assembly being supported at an upper end of said coiumn, said head assembly including a balance beam and a support arm, said support arm being secured to said upper end of said column and extending transversely with respect to said column and having means to pivotally support said balance beam for oscillation about a horizontal axis, said balance beam having a free end remote from said horizontal axis which is displaced upwardly or downwardly when said balance beam is out of balance, movable weights carried by a balance beam to balance the force produced by said load on said platform, means to sense a balance condition in said balance beam, said last mentioned means including a motion conversion means mounted on said balance beam to convert the upward or downward displacement of said free end into a horizontal displacement, indicia means on said motion conversion means and said beam to sense a balance condition of said beam by indicating when said balance beam is level, said means to sense a balance condition including actuator means mounted on said support art to engage said motion conversion means to displace an indicator horizontally in opposite directions when said free end moves in either direction from its balanced position, said actuator means mounted on said support arm including a horizontally extending pin which engages said motion conversion means to provide a low friction connection between said support arm and said balance beam.

13. The beam scale of claim 12 wherein said beam and said support arm are mounted at chest height with respect to a person standing on said platform, said indicia being positioned on said motion conversion means and beam for alignment in the level position of said beam.

14. The beam scale of claim 12 wherein said balance beam comprises a rectangular frame having vertical end and side walls defining a mechanism chamber, a partition wall extending across said chamber adjacent one end wall, said partition wall being parallel to and spaced from said one end wall to accommodate said motion conversion means and said actuator means, said motion conversion means being mounted in said one end wall and said partition wall.

* * * * *